Patented May 21, 1946

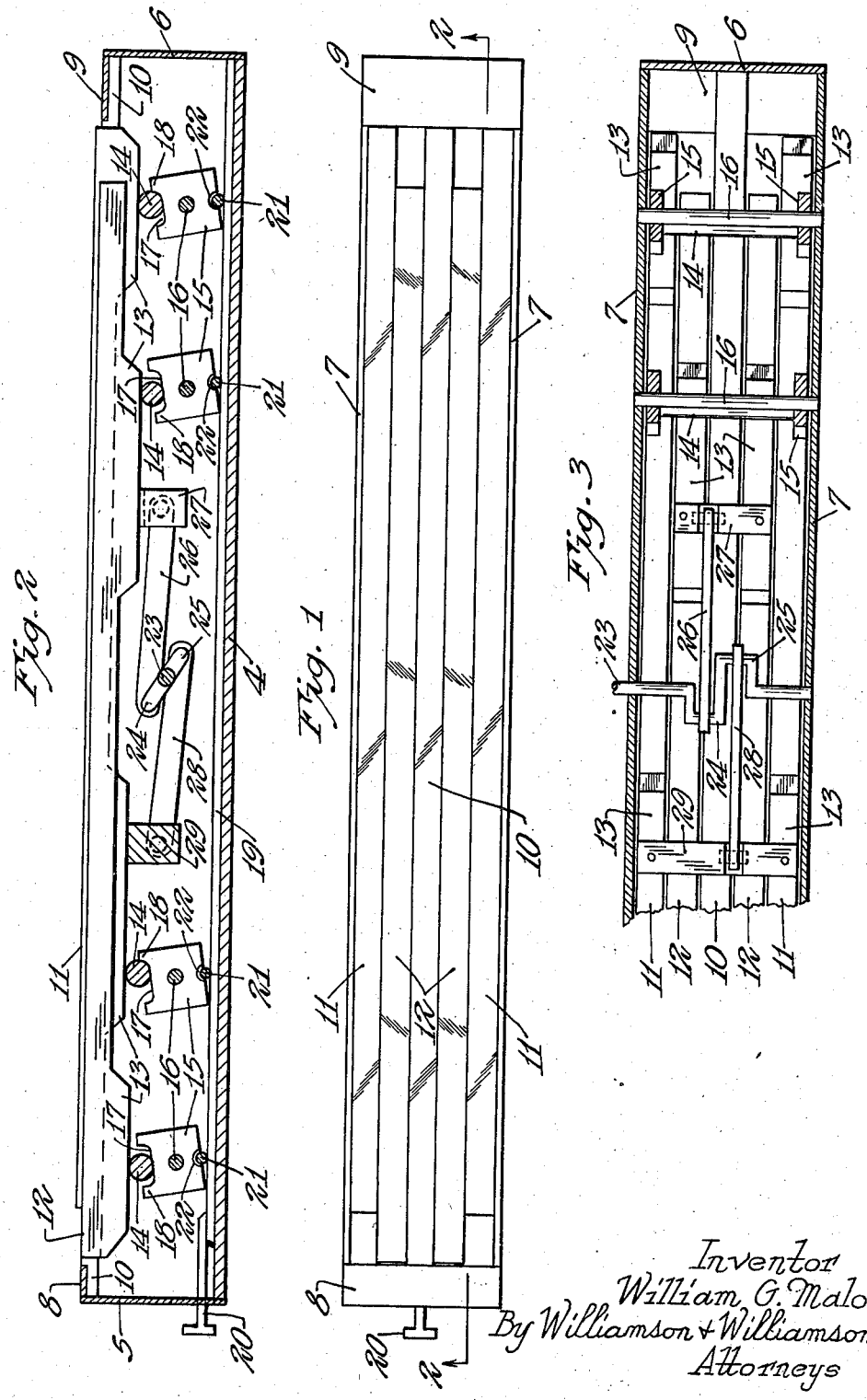

2,400,763

UNITED STATES PATENT OFFICE 2,400,763

CONVEYER STRUCTURE

William G. Malo, Marshall, Minn.

Application June 9, 1944, Serial No. 539,469

4 Claims. (Cl. 198—219)

This invention relates to conveying mechanism wherein articles are carried by a step by step supporting structure.

It is a general object of the invention to provide a conveyer made up of reciprocating or oscillating supporting members and wherein one supporting member lies closely adjacent to and moves relative to another supporting member.

It is a further object of the invention to provide longitudinally disposed supporting members or carriers and supporting and actuating members for the carriers which will cause the carriers to move upwardly during their initial foward motion and thence substantially horizontally throughout the limit of their forward motion and finally to drop downwardly and return rearwardly to their initial starting position.

Still another object of the invention is to provide a conveyer of the type described above which can be very easily reversed so that the direction of movement of articles supported by the conveyer can be similarly reversed.

These and other objects and advantages of the invention will more fully appear from the following description made in connection with the accompanying drawing, wherein like reference characters refer to the same parts throughout the views, and, in which:

Figure 1 is a plan view of an embodiment of the invention;

Figure 2 is a section taken approximately on the line 2—2 of Figure 1; and

Figure 3 is a fragmentary horizontal section through the device, looking upwardly from the lower portion thereof.

In the drawing there is illustrated a base 4, end members 5 and 6, and sides 7. End top pieces 8 and 9 extend between the sides horizontally from the end members 5 and 6. Extending longitudinally between the end members 5 and 6 and midway between the sides 7 is a central stationary support 10, and on each side of the central support 10 are movable slats or conveyer members 11 and 12 which extend longitudinally of the conveyer structure.

Each of the longitudinal slats or conveyer members 11 or 12 is provided with a downwardly extending portion 13 having a substantially horizontal bottom surface as shown in Figure 2. The conveyer members 11 and 12 rest upon rollers 14 which in turn are supported by roller supports generally designated at 15. Each of the roller supports 15 is mounted upon a substantially central pivot 16. The top of each roller support 15 is provided with a roller receiving portion 17, the ends of which are defined by upstanding portions 18. It will be noted that the roller receiving portions 17 are somewhat longer than the diameters of the rollers 14.

Beneath the roller supports 15 extends an actuating bar 19 which has an actuating handle 20 secured thereto. The actuating handle 20 as shown in Figures 1 and 2 extends through the end 5 of the main casing so that it can be grasped and said handle 20 and the actuating bar 19 can be shifted longitudinally of the conveyer structure.

Mounted upon the actuating bar 19 are transversely positioned rods 21 which are positioned to loosely fit substantially semi-circular cut outs 22 formed in the medial lower portions of the roller supports 15. Consequently, when the actuating handle 20 is pulled outwardly or to the left as viewed in Figure 2 the roller supports 15 will be shifted so that their roller receiving surfaces 17 will be slanted in a direction opposite to that shown in the drawing.

Extending transversely of the sides 7 and substantially midway between the ends 5 and 6 is a power shaft 23 which is shown in Figure 3 to be in the form of a crank shaft. The shaft 23 extends from one side of the casing and is adapted to be connected to a motor or other power source.

In the illustrated embodiment the power shaft 23 is provided with two cranks 24 and 25. A connecting rod 26 connects the crank 24 to a cross member 27 which in turn is secured to the conveyer elements 12. A similar connecting rod 28 connects the crank 25 to a cross member 29 which is secured to the conveyer members 11.

Upon rotation of the crank shaft 23 and consequent actuation of the connecting rods 26 and 28 the conveyer members 12 and 11 respectively will be moved with a generally reciprocatory motion. Referring to Figure 2 when one of the conveyer members 12 moves to the right it will ride upon its supporting rollers 14 and said rollers will also move to the right upon their roller supports 15. Since the roller supports 15 are inclined upwardly to the right the conveyer members 12 will not only move to the right but will also be elevated until the rollers 14 reach the right hand upstanding members 18 on the roller supports 15. The travel of the rollers 14 is considerably less than the throw of the crank shaft 23 and as a result the conveyer members will be elevated only during the initial portion of their forward motion. When the rollers 14 have reached their limit of movement the conveyer members will then move in a truly horizontal direction to the limit of the throw of the crank shaft 23. This movement takes place during one-half of a crank shaft revolution. During the other half or the return movement of the crank shaft, the rollers 14 will move from their right hand to their left hand limits of movement, thus causing the conveyer members to move downwardly and rearwardly to their initial position.

With the cranks 24 and 25 disposed oppositely to each other the pairs of conveyer members 11 and 12 will oscillate in opposite directions thereby producing a step by step movement of articles placed upon the conveyer.

When the operating handle 20 is pulled outwardly or to the left as viewed in Figures 1 and 2 the roller supporting members 15 will be shifted about their pivots 16 so that the roller engaging portions 17 will have an opposite slant and the effective movement of the conveyer members 11 and 12 will be reversed, although the crank shaft 23 will still rotate in the same direction.

From the foregoing description it will be seen that I have provided a simple mechanism for conveying articles wherein they are moved with a step by step motion from a continuously rotatable power shaft. The conveying members 11 and 12 are maintained in a horizontal position even though they travel in an upwardly and downwardly slanting direction. As stated above the direction of movement of articles on the conveyer can be reversed at will without changing the direction of rotation of the main power shaft or crank shaft.

It will, of course, be understood that various changes may be made in the form, details, arrangement and proportions of the various parts without departing from the scope of my invention.

What I claim is:

1. In a conveyer, a pair of elongated article supports adjacent each other and arranged for simultaneous rectilinear reciprocation in opposite directions, a carrier for each of said supports, each carrier having a portion thereof arranged for longitudinal and upward inclined movement and being in supporting contact with an article support, and each carrier including means for limiting the longitudinal and forward movement of said portion thereof to less than a reciprocating stroke of each article support, and said article supports and carriers being synchronized to produce an upward inclined movement of said carrier portions and supports during the initial part of the strokes of said supports in one direction.

2. In a conveyer, a pair of elongated article supports adjacent each other and arranged for simultaneous rectilinear reciprocation in opposite directions, a carrier for each of said supports, each carrier having a portion arranged for longitudinal and upward inclined movement and being in supporting frictional contact with an article support, and each carrier including means for limiting the longitudinal and forward movement of said portion thereof to less than a reciprocating stroke of each article support, and said article supports and carriers being synchronized to produce an upward inclined movement of said carrier portions and supports during the initial part of the strokes of said supports in one direction.

3. The structure in claim 2, and said carrier portions being movable with said article supports during their initial return strokes in a downward inclined direction to lower said carrier portions and article support during said return strokes of said supports.

4. In a conveyer, an article support, rectilinear drive means for reciprocating said support, and an inclined movement carrier at least partially supporting said article support, said carrier being movable with said article support during the beginning of a reciprocation of said article support in one direction to elevate said article support, and said article support being movable rectilinearly throughout the remainder of its reciprocation in said one direction independent of movement of said carrier.

WILLIAM G. MALO.